Feb. 6, 1934.  H. W. DAUDT  1,946,195
PURIFICATION OF ORGANIC FLUORINE COMPOUNDS
Filed Aug. 10, 1932
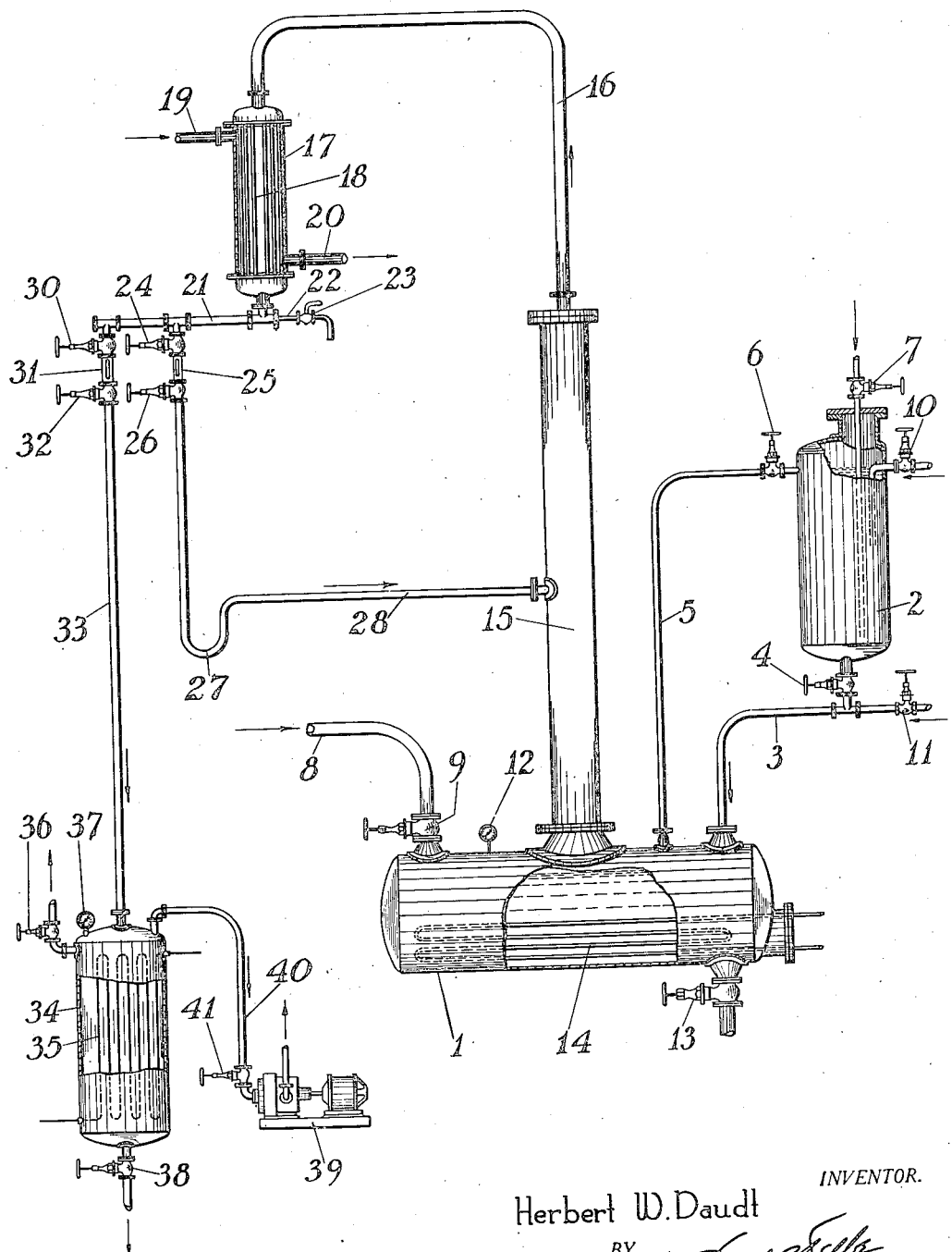
Herbert W. Daudt INVENTOR.
BY 
ATTORNEY.

Patented Feb. 6, 1934

1,946,195

UNITED STATES PATENT OFFICE 1,946,195

PURIFICATION OF ORGANIC FLUORINE COMPOUNDS

Herbert Wilkens Daudt, Wilmington, Del., assignor to Kinetic Chemicals Inc., Wilmington, Del., a corporation of Delaware Application August 10, 1932. Serial No. 628,153

12 Claims. (Cl. 260—162)

This invention relates to organic halogen compounds, more particularly compounds containing one or more acyclic carbon atoms having attached thereto one or more fluorine atoms, and a process for the purification thereof.

In the manufacture of organic fluorine compounds such as, for example, difluoro-dichloromethane, fluoro,chloro-methane, fluoro-trichloromethane, fluoro-chloro-ethanes, and, in general, compounds such as result from the reaction of a fluorinating agent with compounds containing one or more acylic carbon atoms having attached thereto one or more halogens other than fluorine, the reaction products and the products resulting after partial purification may have present therein acidic impurities such as, for example, hydrogen halides, phosgene, chlorine, sulfur dioxide, thionyl fluoride, hydrogen sulfide and analagous compounds. These impurities are customarily removed from the reaction products by aqueous scrubbing agents such as aqueous solutions of alkaline reagents. The fluorinated products obtained after such aqueous scrubbing normally contain water which is usually removed by scrubbing with concentrated sulfuric acid. It has been noted that products obtained after the sulfuric acid treatment may contain small amounts of acidic impurities, particularly phosgene and sulfur dioxide. Such impurities if allowed to remain in the final products render them unfit for commercial use. Difficulty has been encountered in their removal because the ordinary methods which would be applicable, as for example aqueous scrubbing with an alkali metal hydroxide, introduce water into the fluorinated products which renders them practically worthless for use as refrigerants.

It is an object of the present invention to produce organic fluorine compounds free from obnoxious and undesirable impurities of the character above described. A further object is to provide a new and improved process for purifying organic fluorine compounds. Another object is to provide a method of removing small amounts of acidic impurities from compounds containing one or more acyclic carbon atoms having attached thereto one or more fluorine atoms, without contaminating the product with water. A still further object is to provide a method of continuously purifying and separating certain organic fluorine compounds from mixtures with other organic fluorine compounds and/or other organic halogen derivatives. A more specific object is to produce substantially dry and pure fluoro-chloro derivatives of aliphatic hydrocarbons. Other objects will appear hereafter.

These objects are accomplished by treating organic fluorine compounds containing acidic impurities with amines, preferably in liquid phase and in a closed distillation cycle, and separating organic fluorine compounds from the resultant product.

The invention may be well illustrated by the process hereinafter described and the apparatus shown in the accompanying drawing, in which the single figure shows somewhat diagrammatically and with parts cut away an arrangement of apparatus suitable for the practice of the invention. In this drawing similar characters refer to similar parts. It will be understood that the apparatus shown is not drawn to scale and is only conventionally illustrated, and furthermore that the process may be carried out in other types of apparatus.

In carrying out the purification treatment with an amine in the apparatus shown, a liquid fluorinated product containing acidic impurities is introduced into boiler 1 from storage vessel 2 through charging line 3 and valve 4. A line 5 equipped with valve 6 is provided to equalize the pressures in boiler 1 and storage vessel 2. The illustrated storage vessel 2 is also provided with a valved inlet 7 through which the product to be purified may be introduced. Boiler 1 is provided with a gauge 12 for indicating pressures in the system and a bottom outlet through valve 13 whereby the contents may be removed as desired. Under ordinary operating conditions valve 13 is closed.

An amine or mixture of amines introduced into boiler 1 through line 8 and valve 9 is mixed with the liquid fluorinated product contained therein, preferably by means of an agitator (not shown). Alternatively, the amine may be mixed with the fluorinated product at some other convenient place in the system. Thus, if desired, the amine or mixture of amines may be introduced into the liquid fluorinated product in storage vessel 2 through valved inlet 10, or in charging line 3, through valved inlet 11.

Distillation of the liquid product in boiler 1 is started under such conditions of temperature and pressure as to prevent decomposition of products formed by the combination of the amine or mixture of amines and acidic impurities contained in the material to be purified. The temperature of distillation is regulated by a heat transfer medium circulating in coils such as shown at 14.

The vapors from boiler 1 pass upward through column 15 and line 16 into a condenser 17 where they are liquefied. The condenser shown is of the tubular type, the tubes 18 being cooled by means of a suitable cooling medium surrounding them. This cooling medium, the nature of which may vary widely depending upon the particular products to be condensed may be introduced and withdrawn from condenser 17 by way of lines 19 and 20.

From condenser 17, the liquid product passes into line 21. Samples of the condensate are removed through a sample line 22 controlled by valve 23 and tested for the presence of acidic impurities. If acidic impurities are found to be present all of the condensate is recirculated to column 15 through valve 24, sight-glass 25, valve 26, trap 27 and line 28, the sight-glass 25 being provided for observation and to afford a means of regulating the rate of flow. In order to remove such acidic impurities as are shown to be present by the samples tested, further amounts of amine are introduced into the system as previously described, and the cycle of distillation and testing continued. If a volatile amine, such as, for example methylamine, is used for the purification and this is present in the samples of condensate, more of the fluorinated product may be introduced into the system.

When the samples of condensate are found to be substantially free from acidic impurities, the purified product is recovered. This is preferably accomplished by adjusting valves 24, 26, 30 and 32, so that a part of the purified liquid flows from line 21 into line 33 while another part is recirculated through trap 27 and line 28 to column 15 where it serves as a reflux liquid. This adjustment of the valves and regulation of the rate of flow of liquid may be effected with the aid of sight-glasses 25 and 31.

The liquid product from line 33 passes into a receiver 34 provided with coils 35 through which a suitable cooling medium may be circulated. This receiver is also provided with a vent through valve 36 for removing gases from the system, a pressure gauge 37, and a bottom outlet through valve 38 for removing the purified, liquid, fluorinated products. If it is desired to operate the process under subatmospheric pressure, the pressure in the system may be reduced by means of a vacuum pump such as illustrated at 39, which is connected to receiver 34 through line 40 controlled by valve 41. It will be understood that the arrangement and materials of construction of the apparatus may vary widely. Sample line 22 may be located at some other point in the cycle. The same is true of vacuum pump 39. Column 15 may be packed or plated or of any other design suitable for distillation. Parts of the apparatus which are maintained at higher or lower temperatures than the surrounding atmosphere are usually lagged and other expedients of mechanical detail which are well known to those skilled in the art are followed.

The invention will be further understood by a consideration of the following examples, in which the parts are given by weight.

*Example I*

From a previous operation, a liquid mixture containing 200 parts of difluoro-chloro-methane, 750 parts of fluoro-dichloro-methane, 50 parts of chloroform, and between 0.1 and 1.0 part of phosgene and sulfur dioxide was obtained and 2.5 parts of dibutylamine mixed therewith. The resultant product was fractionally distilled to produce difluoro-chloro-methane, fluoro-dichloro-methane and chloroform in a very high state of purity. Difluoro-chloro-methane boils at about $-15°$ C. under a total pressure of 1520 mm. of mercury while fluoro-dichloro-methane boils at about $+8.7°$ C. under atmospheric pressure.

*Example II*

To a liquid mixture having the following composition:

450 parts of difluoro-dichloro-methane
500 parts of fluoro-trichloro-methane
45 parts of carbon tetrachloride
0.1 to 1.0 part of phosgene and sulfur dioxide there was added 5 parts of aniline and 5 parts of triethanolamine and the resultant product agitated in closed equipment for one hour. By subjecting the product to fractional distillation difluoro-dichloro-methane and fluoro-trichloro-methane were obtained in a high state of purity, both phosgene and sulfur dioxide having been eliminated. The distillation was conducted by allowing the difluoro-dichloro-methane to distil at a temperature of about $18°$–$20°$ C. under a pressure of 65 pounds per square inch (gauge) and thereafter reducing the pressure to atmospheric to recover the fluoro-trichloro-methane which, at this pressure, boils at about $23.6°$ C.

*Example III*

A gaseous mixture containing 1000 parts of crude difluoro-dichloro-methane produced by the reaction of hydrofluoric acid with carbon tetrachloride in the presence of a fluorinating catalyst, was scrubbed with a dilute caustic solution and then with sulfuric acid (85–95%). The resultant vapors were condensed at $-50°$ C. and the condensate collected in a receiver to which had previously been added one part of aniline and one part of benzylamine. The liquid mixture was transferred to a still of the character previously described and fractional distillation started under an initial pressure of 65 pounds per square inch (gauge) and a temperature of about $18°$–$20°$ C. Difluoro-dichloro-methane was obtained in a very high state of purity and free from all acidic impurities.

The invention is generally applicable to the purification of compounds containing one or more acyclic carbon atoms having attached thereto one or more fluorine atoms. Included among such compounds are fluorinated products such as are obtained by the fluorination of methylene chloride ($CH_2Cl_2$), fluoro-trichloro-methane ($CFCl_3$), ethyl chloride ($CH_3-CH_2Cl$), isopropyl bromide ($CH_3-CHBr-CH_3$), ethylene dibromide ($CH_2Br-CH_2Br$), tetrachlorethane ($CHCl_2-CHCl_2$), trichlorethylene ($CHCl=CCl_2$), chloroform ($CHCl_3$), carbon tetrachloride ($CCl_4$), trifluoro-trichloro-ethane ($C_2F_3Cl_3$), dichloroethane ($C_2Cl_2H_4$), hexachlorethane ($C_2Cl_6$), tetrachlorethylene ($Cl_2C=CCl_2$), and halogen derivatives of higher members of the aliphatic series. The term halogenated aliphatic hydrocarbon is used in the specification and claims to mean acylic hydrocarbons in which one or more or even all of the hydrogen atoms have been substituted or replaced by halogens. It will be understood that the term fluorinated aliphatic hydrocarbon refers to halogenated aliphatic hydrocarbons containing at least one fluorine atom.

The particular amine or mixture of amines employed in accordance with the invention may vary widely depending largely upon the nature of the acidic impurity to be removed from the fluorinated product. The action of the amine in removing acidic impurities may be selective. Thus, the removal of acidic impurities such as sulfur dioxide is ineffective with weakly basic amines, as for example aniline. For the removal of such acidic impurities, a strongly basic amine is preferably employed. By a strongly basic amine is meant an amine having an ionization constant approximately equal to or greater than about $1.8 \times 10^{-5}$.

In the purification of fluorinated products from phosgene according to the present invention, tertiary amines, even though strongly basic (as for example, triethanolamine), usually have been found to be ineffective. Efficient removal of phosgene has been obtained, however, with all primary and secondary amines tested, even though weakly basic. Thus, aniline, which is of little value for the removal of sulfur dioxide, readily removes phosgene. In purifying organic fluorine compounds containing both phosgene and sulfur dioxide, therefore, it is preferable to employ a strongly basic primary or secondary amine, or mixtures thereof, or mixtures of strongly basic tertiary amines and primary and/or secondary amines of any desired basicity. If desired, dialkylanilines such as dimethyl- and diethyl-aniline may be used to remove phosgene.

In practicing the invention according to the procedure described above, the amines employed may be selected from the usual well known classes of amines, viz., (1) aliphatic amines—that is, compounds which may be derived from ammonia by replacing one, two, or all three of the hydrogen atoms by an acyclic radical containing carbon and hydrogen; (2) alphyl amines—that is, compounds which may be derived from ammonia by replacing at least one of the hydrogen atoms with an acyclic carbon group having attached thereto a saturated or unsaturated ring; (3) carbocyclic amines—that is to say, amines having a saturated or unsaturated carbon ring attached directly to the nitrogen of the amino group; and (4) N-heterocyclic amines—that is, compounds in which the nitrogen of the amino group is part of a saturated or unsaturated heterocyclic ring. It will be understood that the amino compounds may contain more than one amino group.

As specific examples of amines falling within the invention may be mentioned: methylamine, aniline, o, m, and p xylidines, o, m, and p toluidines, benzylamine, ethylamine, difluoro-ethyl-amine allylamine, propylamine, triethanolamine, diethanolamine, diphenylamine, dipropylamine, trimethylene-diamine, ethyl-benzylamine, phenyl-ethylamine, methylphenyl-methylamine, dihydroxy propylamine, diethyl-aminoethyl alcohol, nicotine, piperidine, dibutylamine, pyrroline, cyclo-hexylamine, ethyl-cyclo-hexylamine, tetrahydro-ortho-toluidine, cyclo-pentylamine, dimethyl aniline, diethyl aniline and hexamethylene tetramine.

The amine or mixture of amines employed should preferably boil at temperatures above the boiling temperature of the desired fluorinated or other halogenated organic compounds. It is desirable, furthermore, that the amines, whether liquid or solid, be soluble in the fluorinated product. Especially desirable results have been obtained in removing sulfur dioxide from fluorinated organic compounds as herein described by treatment with triethanolamine. In removing both sulfur dioxide and phosgene from the fluorinated product, mixtures of triethanolamine with a primary aromatic amine of the benzene series such as aniline, o toluidine, and the like have given very desirable results. In mixtures of this character, the more strongly basic component (triethanolamine in the above noted case) may be replaced in whole or in part by a mild alkali such as sodium carbonate.

The proportions of amine employed in accordance with the invention may vary within relatively wide limits depending largely upon the kind and amount of acidic impurities in the compounds treated. Ordinarily the addition of the amine is made upon an empirical basis, for instance as described with reference to the apparatus shown in the drawing. Where an amine is employed which is non-volatile under the conditions of distillation, it is desirable to employ an excess over that required for removal of the acidic impurities. If a volatile amine is employed, an excess is preferably avoided.

In distilling the desired products from the products formed by the chemical combination of the acidic impurities with amine, the method of procedure is susceptible of considerable variation and modification particularly as regards the pressures and temperatures employed. Generally speaking, the temperature and pressure should be so regulated as to avoid decomposition of the product formed by combination of the amine with certain acidic impurities. At atmospheric pressure, temperatures below about 60°–70° C. are preferably employed. For the recovery of liquids which are gases at ordinary temperatures such as, for example, difluoro-dichloro-methane, the distillation is preferably effected under superatmospheric pressure. On the other hand, relatively high boiling liquids such as, for example, difluoro-tetrachloro-ethane (B. P. 93° C.), are preferably distilled under subatmospheric pressure. Where the amine and products thereof with the acidic impurities are insoluble in the liquid fluorinated product mechanical methods of separation may be employed.

The invention is especially valuable for the production of fluorinated aliphatic hydrocarbons free from small amounts of acidic impurities, such as sulfur dioxide and phosgene. Such impurities if allowed to remain in these products would render them not only disagreeable to handle but unsatisfactory for the commercial uses to which they are applied. Pure difluoro-dichloro-methane, for example, is an excellent refrigerant, not only because of its thermal properties, but also because it possesses other desirable characteristics of high commercial utility in being stable and non-toxic. On the other hand, difluoro-dichloro-methane containing even relatively small amounts of sulfur dioxide and phosgene is an almost unsalable product. A particular advantage of the invention is that it enables the removal of acidic impurities from organic fluorine compounds without contaminating the product with water. It will be recognized that this is highly important in the production of products which are to be used as refrigerants.

As many apparent and widely different embodiments of this invention may be made without departing from the spirit thereof, it is to be understood that I do not limit myself to the foregoing examples or description except as indicated in the following claims.

I claim:

1. The process of purifying fluorinated aliphatic hydrocarbons containing acidic impurities which includes contacting an amine therewith, and separating fluorinated aliphatic hydrocarbons from the resultant product.

2. The process of purifying a fluorinated aliphatic hydrocarbon product containing acidic impurities which includes contacting said product in liquid phase with an amine and separating fluorinated aliphatic hydrocarbons from the resultant product.

3. The process of purifying fluorinated aliphatic hydrocarbons containing an acidic impurity which includes contacting said compounds in liquid form with an amine which is soluble therein and subjecting the resultant product to fractional distillation under conditions of temperature and pressure causing substantially no decomposition of the product formed by chemical combination of the amine and the acidic impurity.

4. A process of purifying a fluorinated aliphatic hydrocarbon product containing phosgene which includes contacting said product with a non-tertiary amine.

5. The process of purifying a fluorinated aliphatic hydrocarbon product containing sulfur dioxide which includes contacting said product with a strongly basic amine.

6. The process of purifying a fluorinated aliphatic hydrocarbon product containing sulfur dioxide and phosgene which includes contacting said product with triethanolamine and a primary aromatic amine of the benzene series and separating the fluorinated aliphatic hydrocarbons from the resultant product.

7. The process of purifying a fluorinated aliphatic hydrocarbon product containing sulfur dioxide and phosgene which includes contacting said product with a strongly basic non-tertiary amine.

8. The process of purifying a fluorinated aliphatic hydrocarbon product containing acidic impurities which includes contacting said product in liquid phase with an amine in a closed cycle, whereby acidic impurities are removed and recovering substantially pure fluorinated aliphatic hydrocarbons by distillation.

9. The process of purifying difluoro-dichloro-methane containing small amounts of acidic impurities which includes contacting an amine therewith, and separating the difluoro-dichloro-methane from the resultant product.

10. The process of purifying difluoro-dichloro-methane containing sulfur dioxide and phosgene which includes contacting a strongly basic non-tertiary amine therewith.

11. The process of purifying difluoro-dichloro-methane containing phosgene which includes contacting aniline therewith.

12. In the manufacture of difluoro-dichloro-methane, by the reaction of hydrogen fluoride, an antimony fluoro-chloride and carbon tetrachloride, after scrubbing the reaction product with an alkaline solution to remove hydrogen halides and thereafter subjecting the product obtained to treatment with sulfuric acid to effect drying thereof, the step which comprises introducing into the product in liquid phase a sufficient amount of an amine to react with substantially all of the acidic impurities which are present and separating the difluoro-dichloro-methane from the resultant product by distillation under conditions of temperature and pressure preventing decomposition of the product formed by the chemical combination of the amine and acidic impurities.

HERBERT WILKENS DAUDT.